United States Patent [19]

Zentner

[11] Patent Number: 4,551,334
[45] Date of Patent: Nov. 5, 1985

[54] DOUGH IMPROVER

[75] Inventor: Harry Zentner, North Ryde, Australia

[73] Assignee: Mauri Brothers & Thomson (Aust.) Pty. Limited, New South Wales, Australia

[21] Appl. No.: 499,376

[22] Filed: May 31, 1983

[51] Int. Cl.$^4$ ............................................. A21D 2/06
[52] U.S. Cl. ...................................... 426/26; 426/653
[58] Field of Search ................... 426/19, 555, 653, 26, 426/20

[56] References Cited

U.S. PATENT DOCUMENTS

| 3,053,666 | 9/1962 | Henika et al. | 426/19 |
| 3,149,979 | 9/1964 | Bohn et al. | 426/555 |
| 3,566,807 | 3/1971 | Blanchard et al. | 426/20 |
| 3,615,680 | 10/1971 | Henika et al. | 426/62 |
| 4,405,648 | 9/1983 | Atsumi et al. | 426/19 |

FOREIGN PATENT DOCUMENTS 0245796  8/1963  Australia ............................. 426/653

*Primary Examiner*—Robert Yoncoskie
*Assistant Examiner*—Marianne M. Cintins
*Attorney, Agent, or Firm*—LeBlanc, Nolan, Shur & Nies

[57] ABSTRACT

A dough improver containing sodium thiosulphate and a method of manufacture of bread using the dough improver are disclosed. The sodium thiosulphate exerts a conditioning effect on dough gradually during yeast fermentation, in contrast to cysteine which reacts almost immediately with wheat protein. The gradual conditioning effect occurs in the presence of yeast and has been found to be advantageous in producing a final bread product having improved properties.

6 Claims, No Drawings

DOUGH IMPROVER

FIELD OF THE INVENTION

This invention relates to a dough improver and to a method of manufacture of an improved dough.

BACKGROUND OF THE INVENTION

Modern methods of bread manufacture, including processes utilizing mechanical dough development and instant doughs, require the use of conditioning agents which make the dough suitable for the various machines and production schedules.

One function of dough conditioners is the softening of the dough, brought about by the inclusion in the dough formula of reducing agents. These act on the disulfide bonds of the wheat proteins, particularly the gluten proteins, rendering the dough soft and pliable and giving it the visco-elastic properties required.

The most commonly used reducing agent is cysteine hydrochloride, usually in combination with sodium metabisulfite.

There are some disadvantages attached to the use of cysteine hydrochloride. It must be used with great care as an overdose will excessively soften the dough and make it too sticky for the machines to process.

Furthermore, the price of cysteine hydrochloride has risen steeply and some believe that it will rise even further in the future.

DISCLOSURE OF THE INVENTION

According to one aspect the invention consists in a dough improver characterized in that it contains sodium thiosulphate.

According to a second aspect the invention consists in a method of manufacture of a bread characterized by the step of adding sodium thiosulphate to the dough.

Hitherto it has been believed that sodium thiosulphate was not suitable for use as a reducing agent in dough. This invention stems from the discovery that sodium thiosulphate when added to dough exerts a conditioning effect on dough gradually during yeast fermentation in the course of the dough leavening process, in contrast to cysteine which reacts almost immediately with wheat protein. The gradual reaction has been found to be advantageous. Sodium thiosulphate exerts its dough-improving effect only in the presence of yeast.

The screening tests by which the suitability of dough ingredients are routinely tested in cereal laboratories are carried out in the Brabender Farinograph and Extensograph. In these tests, only unyeasted doughs can be used.

Therefore, effects which depend on the presence of yeast in the dough cannot be observed by these tests and this is believed to be the reason that the dough-improving effect of sodium thiosulphate has so far remained undiscovered.

PREFERRED EMBODIMENTS OF THE INVENTION

By way of example only a bread improver according to the invention will now be described. There is shown below an improver composition for a chemically developed dough.

IMPROVER COMPOSITION

Potassium bromate—1.20%
Ascorbic Acid—4.00%
Malt flour—30.70%
Fungal enzyme—6.70%
Sodium thiosulphate—1.20%
Sodium metabisulphite—0.40%
Ground wheat—55.80%

As will be understood by those skilled in the art the composition may be varied according to the manufacturing method and the characteristics of the flour used. However the inclusion of sodium thiosulphate is novel. This improver is used at the rate of approximately 0.25% based on flour weight. By way of example, flour characteristics are given below.

FLOUR CHARACTERISTICS

Protein ($N \times 5.7$)—11.9%
Moisture—13.2%
Maltose equivalent—1.76%
AACC Starch damage—7.90%
Colour grade—0.8%

FARINOGRAPH TEST RESULT

Development time—6.5 min.
Stability—10.0 min.
Time to breakdown—12.0 min.
Water absorption—65.0%

A typical dough for bread to be produced with this particular type of improver has the following composition:
Flour—100.0%
Salt—2.0%
Improver—0.25%
Fat—2.0%
Yeast—3.0%
Water—60.0%

The dough is mixed for between 25 to 32 minutes in a conventional 2-arm mixer to a dough temperature of between 27°-30° C. The dough is then given a floor time of 0 to 45 minutes and a proof time of about 40 minutes before baking. New South Wales Flours and Queensland flours were used in baking tests.

Loaves of bread prepared with improvers containing sodium thiosulphate showed greater load volume, great softness of crumb, better crumb structure and superior crust formation than loaves prepared with improvers which did not contain sodium thiosulphate.

Sodium thiosulphate exerted an improving effect on a range of flours including both flours from New South Wales which are very well balanced, and on the much stronger flours from Queensland.

Furthermore, sodium thiosulphate fits well into improver formulations and it exerts a synergistic effect when combined with commonly used improver ingredients such as sodium metabisulfite.

As will be appreciated by those skilled in the art, the invention is not limited to use in chemically developed doughs, nor is it limited to use in improvers of the composition of the example. Doughs improved by the method of the invention may be made from flours other than wheat flour and may be used for the purpose of baking bread, bread rolls, bagels, croissants, cakes and other forms of pastry.

I claim:
1. A method for producing bread which comprises:

(a) adding sodium thiosulphate to a yeast-containing dough mixture, said sodium thiosulphate being added as a component of an improver composition, said improver composition being present in an amount of about 0.25% based on the weight of the flour component of the dough;

(b) allowing the mixture to ferment; and (c) baking the fermented dough.

2. The method of claim 1 wherein sodium thiosulphate is present in an amount of between 0.5% and 2% of the improver composition.

3. The method of claim 2 wherein the improver composition contains about 1.2% of sodium thiosulphate.

4. A bread dough composition comprising yeast-containing dough and an improver composition which includes sodium thiosulphate, said improver composition being present in an amount of about 0.25% based on the weight of the flour component of the dough.

5. The composition of claim 4 wherein sodium thiosulphate is present in an amount of between 0.5% and 2% of the improver composition.

6. The composition of claim 5 wherein the improver composition contains about 1.2% sodium thiosulphate.

* * * * *